(12) United States Patent
Cholkar et al.

(10) Patent No.: US 9,525,709 B2
(45) Date of Patent: Dec. 20, 2016

(54) MULTIMEDIA CONVERSATION HISTORY

(71) Applicant: GENBAND US LLC, Frisco, TX (US)

(72) Inventors: Arjun Cholkar, Frisco, TX (US); Ibrahim Dogru, Istanbul (TR); Don Gilchrist, Frisco, TX (US)

(73) Assignee: GENBAND US LLC, Plano, TX (US)

( * ) Notice: Subject to any disclaimer, the term of this patent is extended or adjusted under 35 U.S.C. 154(b) by 161 days.

(21) Appl. No.: 14/484,008

(22) Filed: Sep. 11, 2014

(65) Prior Publication Data

US 2015/0295955 A1 Oct. 15, 2015

Related U.S. Application Data

(60) Provisional application No. 61/978,705, filed on Apr. 11, 2014, provisional application No. 61/987,317, filed on May 1, 2014.

(51) Int. Cl.
*H04L 29/06* (2006.01)
*H04M 3/56* (2006.01)

(52) U.S. Cl.
CPC ....... *H04L 65/1066* (2013.01); *H04L 65/1069* (2013.01); *H04L 65/1089* (2013.01);
(Continued)

(58) Field of Classification Search
CPC ............. H04L 65/1066; H04L 65/1069; H04L 65/1089; H04L 65/1093; H04L 65/403; H04L 65/4053; H04M 3/567
See application file for complete search history.

(56) References Cited

U.S. PATENT DOCUMENTS

| 5,907,324 A * | 5/1999 | Larson | H04L 12/1822 715/751 |
| 2008/0189624 A1* | 8/2008 | Chotai | G06Q 10/109 715/753 |

(Continued)

OTHER PUBLICATIONS

Stephen Cho, "Hangouts Enrich Apps Everywhere With Video Meetings", Google: Official Enterprise Blog, Jun. 3, 2014, http://googleenterprise.blogspot.com/2014/06/hangouts-enrich-apps-everywhere-with.html, accessed on Sep. 12, 2014.

(Continued)

*Primary Examiner* — Brian J Gillis
*Assistant Examiner* — Gil H. Lee
(74) *Attorney, Agent, or Firm* — Haynes and Boone, LLP

(57) ABSTRACT

A method performed by a computing system includes maintaining a record of a terminated conversation, the conversation comprising a plurality of participants and a plurality of media types, wherein the media types used during the conversation changed during the conversation. The method further includes receiving a request from a client system associated with a participant of the terminated conversation, the request being to reestablish the terminated conversation. The method further includes, in response to the request, initiating reestablishment of the terminated conversation by attempting to reestablish the terminated conversation, wherein attempting to reestablish the terminated conversation includes a default setting of initiating communication sessions between a cumulative total of each of the participants using a cumulative total of each media type associated with the terminated conversation.

21 Claims, 5 Drawing Sheets

(52) U.S. Cl.
CPC ........ *H04L 65/1093* (2013.01); *H04L 65/403* (2013.01); *H04L 65/4053* (2013.01); *H04M 3/567* (2013.01)

(56) References Cited

U.S. PATENT DOCUMENTS

| | | | | |
|---|---|---|---|---|
| 2011/0185288 A1* | 7/2011 | Gupta | ............... | G06Q 10/10 715/752 |
| 2012/0128322 A1* | 5/2012 | Shaffer | ............... | H04N 9/8205 386/241 |
| 2013/0097541 A1* | 4/2013 | Yerli | ............... | G06F 3/0486 715/769 |
| 2013/0198288 A1* | 8/2013 | Jones | ............... | H04L 12/1831 709/204 |
| 2015/0149540 A1* | 5/2015 | Barker | ............... | H04L 12/1827 709/204 |

OTHER PUBLICATIONS

Google Hangouts—A Complete Guide, http://www.youtube.com/watch?v=C3WouWiu7pI, Pub. Jan. 14, 2014, accessed on Sep. 12, 2014.

Avaya Flare Experience Guided Tour, http://www.avaya.com/usa/campaign/avaya-flare-experience-guided-tour/, accessed on Jul. 2014.

Genband Smart Office, https://www.youtube.com/watch?v=J5Ekolbti_U, Pub. Feb. 18, 2013, accessed on Sep. 12, 2014.

MWC13 Genband Smart Office, https://www.youtube.com/watch?v=n26wdugnT7M, Pub. Mar. 25, 2013, accessed on Sep. 12, 2014.

Smart Office Conversation Manager Demo, https://www.youtube.com/watch?v=DAM6a4Tk0lU, Pub Mar. 24, 2014, accessed on Sep. 12, 2014.

\* cited by examiner

MULTIMEDIA CONVERSATION HISTORY

PRIORITY

The present application claims the benefit of U.S. Provisional Patent Application No. 61/978,705 filed Apr. 11, 2014 entitled "Collaborative Multimedia Communication" and U.S. Provisional Patent Application No. 61/987,317 filed May 1, 2014 entitled "Collaborative Multimedia Conversation Manager," the disclosures of which are hereby incorporated by reference in their entirety.

BACKGROUND

The present disclosure relates generally to communication management, and more particularly to methods and systems for intuitive multimedia, multiparty communication.

People often communicate using various types of media. For example, people may engage in voice communication over the phone, whether by a landline, mobile phone, or voice over internet protocol (VOIP) applications. Additionally, users may use email, video conferencing, screen sharing (or other real-time collaborative communication applications), instant messaging applications and other types of media for communication.

In general, when one user is communicating with another user using one type of media and desires to use a second type of media, the user has to manually connect or set up a connection with the new media. For example, if a user is on a phone call with another user and desires to share his or her computer desktop with the other user, the user has to manually set up the desktop sharing with the other user. This typically involves sending a link via email to the other user. Additionally, certain users regularly communicate with multiple users at a time using multimedia communications between multiple parties.

Managing multiple applications and media types can often be a daunting task for a user. This can have an adverse effect on productivity. Additionally, this may be a source of frustration for a user. Thus, it is desirable to provide methods and systems that provide a better user experience for various communication applications.

SUMMARY

A method performed by a computing system includes maintaining a record of a terminated conversation, the conversation comprising a plurality of participants and a plurality of media types, wherein the media types used during the conversation changed during the conversation. The method further includes receiving a request from a client system associated with a participant of the terminated conversation, the request being to reestablish the terminated conversation. The method further includes, in response to the request, initiating reestablishment of the terminated conversation by attempting to reestablish the terminated conversation, wherein attempting to reestablish the terminated conversation includes a default setting of initiating communication sessions between a cumulative total of each of the participants using a cumulative total of each media type associated with the terminated conversation.

A method performed by a client computing system includes providing to a user of the client system, a conversation history object, the conversation history object being presented through a graphical user interface (GUI), the conversation history object representing a record of a terminated conversation in which the user was a participant, the terminated conversation including multiple participants and multiple media types, wherein at least one of the media types was added during the terminated conversation. The method further includes, in response to a user interaction with the conversation history object, transmitting to a conversation manager, a request to reestablish the terminated conversation with a cumulative total of each participant and a cumulative total of each media type used at any point in the terminated conversation, such that the conversation manager initiates reestablishment of the terminated conversation.

A computing system acting as a conversation manager includes a processor and a memory comprising machine readable instructions that when executed by the processor, cause the system to maintain a record of a terminated conversation, the conversation comprising a multimedia, multiparty communication session established by the computing system, wherein at least one type of media was added to the terminated conversation during the terminated conversation. The system is further to provide record data to a client system for use with a conversation history graphical user interface (GUI) object that represents the record of the communication session, the client system being associated with a user who was a participant of the terminated conversation. The system is further to receive input from the client system, the input requesting reestablishment of the terminated conversation, and initiate reestablishment of the communication session by initiating multimedia communication sessions between all participants of the terminated conversation with a cumulative total of types of media used at any point in time during the terminated conversation.

A method performed by a conversation manager on a server system includes maintaining a record of a terminated conversation, the conversation comprising a plurality of participants and a plurality of media types, wherein the media types used during the conversation changed during the conversation. The method further includes receiving a request from a client system associated with a participant of the terminated conversation, the request being to reestablish the terminated conversation. The method further includes, in response to the request, initiating reestablishment of the terminated conversation by attempting to reestablish the terminated conversation, wherein attempting to reestablish the terminated conversation includes initiating communication sessions between the participants as the terminated conversation existed at a point in time during the terminated conversation. At least one of the participants accessed the conversation with a communication application within a same platform as the conversation manager, and at least one of the participants accessed the conversation with a communication application outside the platform.

BRIEF DESCRIPTION OF THE DRAWINGS

Aspects of the present disclosure are best understood from the following detailed description when read with the accompanying figures.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

According to principles described herein, a computing system may record a timeline of a multiparty, multimedia conversation. The recorded timeline may include a variety of information such as when each participant of the conversation joined or left the conversation. Additionally, the timeline may include when each user added or removed a type of media to or from the conversation. Such a detailed history of the conversation can be used for various purposes to the advantage of a user. Particularly, the user can reinitiate the conversation such that the reinitiated conversation represents a cumulative total of all participants and media types that were used during the conversation.

In one example, recording a timeline and reinitiating a multiparty, multimedia conversation is enabled by a conversation manager. A conversation manager includes hardware, software or a combination of both to perform the tasks associated with establishing and managing conversations between multiple users. In one example, the conversation manager runs on a server system. The server system is in communication with a number of user devices via one or more networks. The user devices may have a client communication application, which will be referred to as the multimedia communication application. The multimedia communication applications running on various user devices may communicate with each other through the conversation manager or directly over a network such as the Internet. Additionally, as will be described in further detail below, the graphical user interface for the multimedia communication application may provide the user with a number of intuitive tools to make communication and collaboration across multiple communication media simpler.

Figure 1:
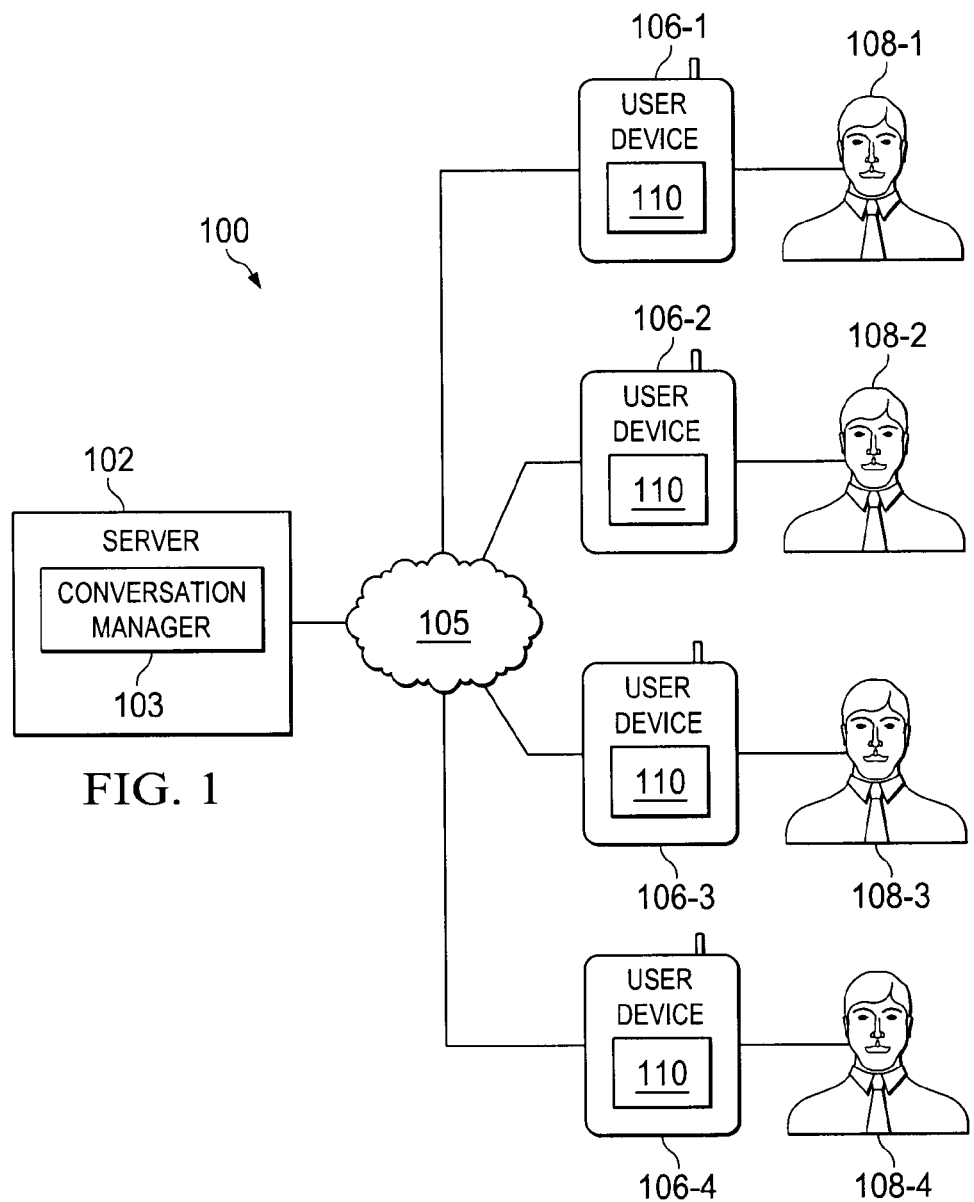
FIG. 1 is a diagram showing an illustrative network environment in which multiple users may communicate using multiple types of media, according to one example of principles described herein.

FIG. 1 is a diagram showing an illustrative network environment 100 in which multiple users 108 communicate using multiple types of media, according to one embodiment. According to the present example, the network environment 100 includes a server 102 and a number of devices 106. Each device 106 is associated with a particular user 108. Each device 106 also has a multimedia communication application 110 installed thereon. The multimedia communication applications 110 communicate over the network 105 with a conversation manager 103 running on the server 102.

The server 102 includes software and hardware that responds to requests over the network 105. Specifically, the server 102 receives requests from various devices 106 over the network 105. The server 102 then responds to those requests accordingly. Such requests may include requests to establish communication from one device 106 to another. In some examples, multiple servers 102 may be used in concert to perform the functions described herein.

The server 102 includes a communication application that will be referred to as the conversation manager 103. In this example, a conversation includes a communication involving two or more users and two or more types of media. Thus, the conversation manager 103 manages communication sessions involving one or more types of media and between two or more end user devices.

The conversation manager 103 may be invoked to perform certain tasks in a variety of situations. For example, when a conversation between two participants is first initiated, the conversation manager 103 establishes the communication sessions between those two participants. When a new participant is added to the conversation, the conversation manager 103 establishes communication sessions between the current participants and the new participants. When a participant leaves the conversation, the conversation manager 103 tears down the communication sessions between the participant who is leaving the conversation and the remaining participants. The conversation manager 103 is also invoked when new media types are added to a conversation. Specifically, the conversation manager 103 establishes communication sessions for the new media type between participants of the conversation. The conversation manager 103 also tears down communication sessions for media types that are being removed from the conversation. More detail about adding and removing participants or media types will be described in further detail below.

The network 105 may include various types of networks involving multiple types of physical media and transport protocols. For example, the network 105 may include a Local Area Network (LAN) using Ethernet, wireless, and fiber optic connections. The network 105 may also include the Internet. The network 105 may include both packet switched networks and circuit switched networks such as a Public Switched Telephone Network (PSTN). The network 105 may use various transmission protocols such as Real-time Transfer Protocol (RTP), Session Initiation Protocol (SIP), and Hypertext Transfer Protocol (HTTP) to transmit data in the form of packets between user devices 106. The network 105 may also include mobile data networks such as Long Term Evolution (LTE) networks. The scope of embodiments is not limited to any particular network technology for use as, or in, network 105.

The user devices 106 may include a variety of different devices such as desktop computers, laptop computers, tablet computing devices, mobile smart phones and others. Different devices 106 may have different media capabilities. For example, desktop computers, laptop computers, and some tablet computing devices may have the capability of sharing the desktop with another device. But, smart phones may not have such capability. In certain embodiments, the conversation manager may determine or identify and track or store information about the capabilities of each user device.

Each device 106 has a multimedia communication application 110 installed thereon. The multimedia communication application 110 provides users 108 of their respective devices 106 with the tools to communicate with each other using various types of media. Thus, the multimedia communication application 110 is designed for use with various types of protocols for different types of media. As described above, such protocols may include, but are not limited to, RTP, SIP, and HTTP. In some examples, the communication applications 110 are similar across devices 106. For example, the communication applications 110 may be provided by the same vendor and may be designed for use with the conversation manager 103, which is also provided by the same vendor. In some cases, however, some devices may have third-party communication applications 110 installed thereon. The conversation manager 103 may be configured to work with such third party.

Each device 106 may be associated with a specific user 108. For example, the first device 106-1 is associated with the first user 108-1, the second device 106-2 is associated with the second user 108-2, the third device 106-3 is associated with the third user 108-3, and the fourth device 106-4 is associated with the fourth user 108-4. In one example, each user is associated with a unique identification string such as a SIP username. Thus, when a user of one device wishes to contact another user, he or she can use that user's unique identification string to make such contact. The conversation manager 103 can associate a user's unique identification string with a protocol address associated with that user's device. For example, the conversation manager 103 may associate a user's unique identification number with a specific Media Access Control (MAC) address or an Internet Protocol (IP) address. In some cases, the associated user may simply be a user that responds to a communication request on a given device 106.

In some examples, a user 108 has an account registered with the conversation manager 103. The user 108 may access his or her account through any device 106 having the multimedia communication application 110 installed thereon. When a user logs in through the multimedia communication application 110 of a specific device 106, the conversation manager 103 can register that device 106 with the unique identification number for that user. Thus, when anyone attempts to start a multimedia conversation with that user, the packet stream will be directed to the proper device. Furthermore, although not shown herein, a single user may be associated with, or logged-in at, more than one device at a time.

The timeline for any conversation between different devices 106 may be recorded and stored by the conversation manager 103 on the server. Additionally, or alternatively, the timeline of a conversation may be recorded and stored locally on the respective devices 106. A user 108 may have access to conversation histories in which only he or she has been involved. If conversation histories are stored locally on the respective devices, then, in some embodiments, only conversations occurring on that device may be stored on that device. Additionally, a user 108 may only access the conversations that were made using his or her account. Likewise, in embodiments wherein the conversation histories are stored remotely and managed by the conversation manager 103, then users 108 will have access to the conversations in which they were a participant.

In some examples, the conversation manager and some of the communication applications 110 may be associated with a particular platform. For example, a communication application 110 and the conversation manager 103 may be designed and provided by the same entity. But, some of the communication applications 110 may be provided by a different entity. The conversation manager 103 can be designed to establish communication sessions with devices 106 that have communication applications 110 that are not designed and provided by the same entity that provides the conversation manager. Thus, the conversation manager 103 can work with communication applications 110 and devices 106 outside the platform associated with the conversation manager 103.

Figure 2:
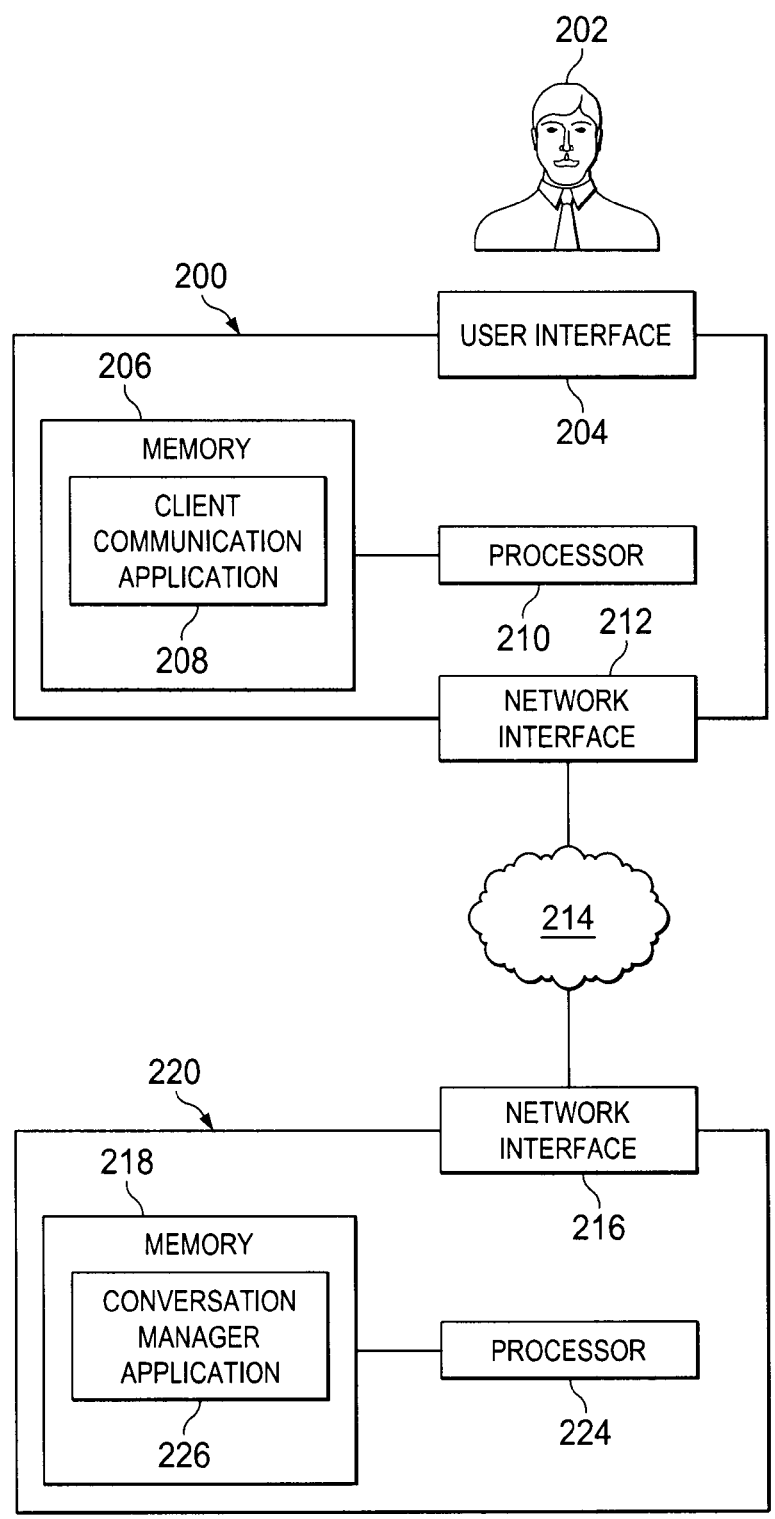
FIG. 2 is a diagram showing an illustrative client/server system, according to one example of principles described herein.

FIG. 2 is a diagram showing an illustrative client/server system. According to the present example, the client system 200 may include a user device such as a desktop computer, laptop computer, smartphone device, or tablet device. The server system 220 can also include any appropriate hardware such as a general purpose computer or other device. An example server includes a multi-processor general purpose computer running an operating system such as Linux. The server system 220 may facilitate communication between various client devices operated by different users having the multimedia communication application 208 installed thereon. The server system 220 runs the conversation manager application 226 that serves requests from the client communication application 208 running on client devices 200.

According to certain illustrative examples, the client system 200 includes a memory 206 which may include software such as the client communication application 208. The client system 200 also includes a processor 210, a network interface 212, and a user interface 204.

The memory 206 may be one of several different types of memory. Some types of memory, such as non-volatile types of memory, typically have large storage volume but relatively slow performance. Volatile memory, such as those used for Random Access Memory (RAM), are optimized for speed and are often referred to as "working memory." The server memory 218 may also include various types of memory such as volatile or non-volatile memory. In some embodiments, the software is stored as computer-readable code in memory 206, 218 and executed by processors 210 and 224 respectively.

The client system 200 also includes a processor 210 for executing software and using or updating data stored in memory 206. The software may include an operating system and various other software applications. For example, the client system includes the client communication application 208, which may be similar to the communication application 110 described in FIG. 1. In addition to the communication application 208, the client device may include other software such as other communication applications, which may interface with the communication application, and other productivity applications such as word processing and web browsing.

The user interface 204 may include a number of input devices such as a mouse, touchpad, or touchscreen that allow the user 202 to interact with a GUI. The user interface 204 may also include a number of different types of output devices such as a monitor or a touchscreen. The user interface allows the user 202 to interact with the client system 200. The user interface may include hardware such as a keyboard, mouse, touchscreen, or other physical buttons. The user interface 204 may also include the software that provides the graphical user interface and various features associated therewith. For example, the graphical user interface may display features such as a conversation history object.

The network interface 212 may include hardware and software that allows the client system 200 to communicate with other devices over a network 214. The network interface 212 may be designed to communicate with the network 214 through hardwire media or wireless media as appropriate. Examples of networks for use in system 214 include the Internet, a LAN, a cellular network or any other appropriate network.

According to certain illustrative examples, the server system 220 includes a memory 218 and a processor 224. The memory may have stored thereon the conversation manager application 226. The server system 220 also includes a network interface 216 for communicating with other devices such as the client system 200.

The conversation manager application 226 may be similar to the conversation manager 103 described above. The implementation of the features described above may be distributed between the server side application 226 and the client side application 208 in a variety of ways. The conversation manager application 226 may store records of conversation histories as conversation history data. Users may have access to those histories and use those histories to reinitiate communication sessions represented by those histories. In some cases, the conversation history data may be stored fully, or in part, on the client device 200. More detail on reinitiating communication sessions will be provided below.

Figure 3:
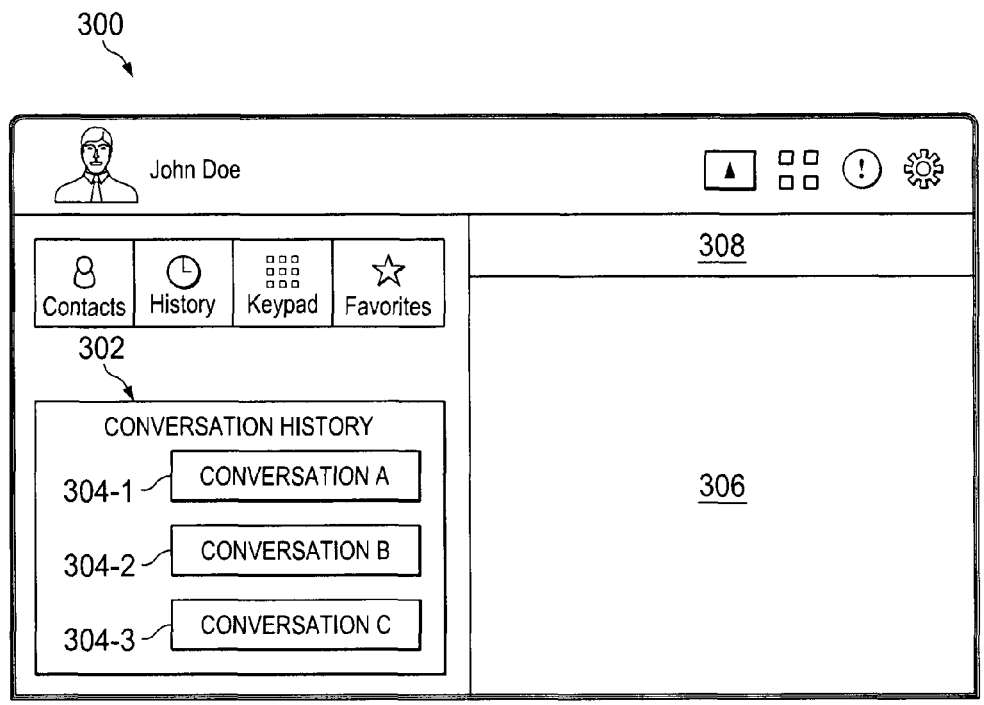
FIG. 3 is a diagram showing an illustrative graphical user interface for a multimedia communication application, the graphical user interface including conversation history objects, according to one example of principles described herein.

FIG. 3 is a diagram showing an illustrative graphical user interface 300 for a multimedia communication application, like multimedia communication application 110 of FIG. 1 and application 208 of FIG. 2, the graphical user interface including conversation history objects 304. For purposes of discussion, the user operating the illustrated graphical user interface 300 will be referred to as the operating user. In this example, a client device displays the graphical user interface 300 to the operating user. According to the present example, the user interface 300 includes a conversation history list 302 displaying a number of conversation history objects 304. The user interface 300 also includes a conversation container 306 and a toolbar 308. The user interface 300 may have features disclosed in provisional patent applications 61/978,705 filed Apr. 11, 2014 and 61/987,317 filed May 1, 2014, both of which are hereby incorporated by reference in their entirety.

The conversation history list 302 displays a list of conversation history objects 304. Each conversation history object 304 represents a different conversation in which the operating user has been a participant. In this example, a first conversation history is represented by a first conversation history object 304-1, a second conversation history is represented by a second conversation history object 304-2, and a third conversation history is represented by a third conversation history object 304-3. The conversation history list 302 is specific to the operating user. Different users will thus have a different listing of conversation history objects. In some examples, the conversation history objects can be ordered with the conversation history objects associated with the most recent conversations being displayed at the top.

The conversation container 306 is a region within the graphical user interface 300 that represents any ongoing communication sessions between other users. In this example, the conversation container 306 is an active object within the graphical user interface 300, and the operating user interacts with the conversation container 306 to manage conversations as desired. As mentioned above, a multiparty, multimedia conversation includes a communication between two or more users and involving two or more media types. In some cases, a multiparty, multimedia conversation includes communication between three or more users and involves two or more types of media. Accordingly, the appearance of the conversation container 306 will depend on the nature of the present conversation. For example, if only voice communication is ongoing, then the conversation container 306 may display a contact object for the user to which communication has been established. If video conferencing is part of the conversation, then the conversation container 306 may display one or more video feeds. If the conversation includes instant messaging, then instant messaging boxes may be displayed within the conversation container 306.

The conversation toolbar 308 may provide the user with a number of selectable objects related to the conversation represented by the conversation container 306. For example, the user may select an object on the toolbar 308 to initiate or terminate communication with various users. The user may select an object on the toolbar 308 to increase or lower volume. The operating user may further add new media types or new users to the present conversation by selecting an object from the toolbar 308.

The conversation history objects 304 may be used to re-initiate the conversations that they represent. For example, the operating user may drag conversation history object 304-1 to the conversation container 306 and drop it to reinitiate the conversation associated with that object 304-1. The methods for dragging and dropping depend on the type of user interface. For example, in a touchscreen interface, a user may touch down on a conversation history object 304-1 within the conversation history list 302. While keeping his or her finger or stylus in contact with the screen, the user can drag the conversation history object 304-1 over to the conversation container 306. While doing so, the selected conversation history object 304-1 (or a shadowed copy of it) may move with the finger or stylus. When the conversation history object 304-1 is substantially over the conversation container 306, the user may lift up to disconnect contact of the screen with his or her finger or stylus. When the touchscreen senses the touch up over the conversation container 306, it is known to the communication application that the user has dropped the conversation history object 304-1 in the conversation container 306 and thus wishes to reestablish the conversation associated with the conversation history object 304-1. In the case of a desktop computer wherein the user interface includes a mouse, the user may move a cursor over the conversation history object 304-1 and click on that conversation history object 304-1. While holding the mouse button down, the user may move the cursor over the conversation container 306 and release the mouse button. The scope of embodiments is not limited to any technique to move an object 304. In certain embodiments, techniques other than drag and drop may similarly be employed for re-invoking a given conversation with the participants and media types as used in given history object 304, such as double-clicking the object, right clicking the object and selecting some action from a menu that is presented (like "re-initiate"), etc.

In response to the conversation history object 304-1 being dropped into the conversation container 306, the client communication application (110, FIG. 1; 208, FIG. 2) sends a request to the conversation manager (103, FIG. 1; 226, FIG. 2) instructing the conversation manager 103 to establish communication between the operating user's device and the devices associated with the users who were participants in the conversation represented by the conversation history object 304-1. The communication between devices includes the media types that were present in the conversation represented by the conversation history object 304-1. After receiving the request, the conversation manager 103 opens the appropriate communication sessions between the operating user and the other users involved in the past conversation. In a voice and/or video example, this may be done using SIP. SIP is used to establish audio and video communication sessions between two or more devices. After the communication session has been established, communication with various protocols may take place over that session. For example, if the conversation involves audio and video, then RTP or other protocol may be used to transfer audio and video streams between two devices. This allows a prior conversation between various participants, which included various media types of varying communication protocols, to easily and efficiently be reestablished by the conversation manager.

Figure 4:
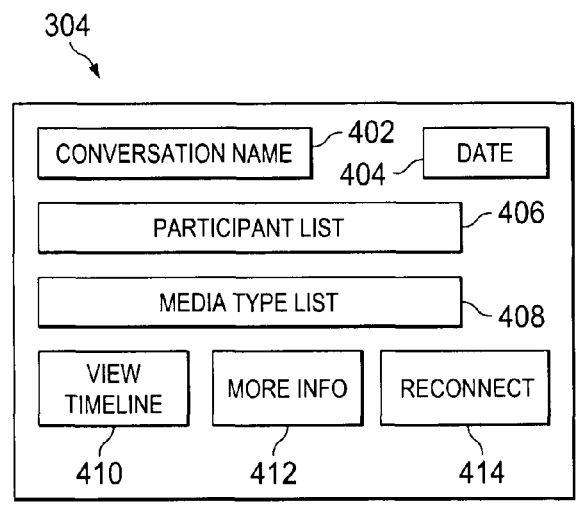
FIG. 4 is a diagram showing an illustrative conversation history object, according to one example of principles described herein.

FIG. 4 is a diagram showing an illustrative conversation history object. According to the present example, the conversation history object 304 includes a conversation name 402, a date 404, a participant list 406, a media type list 408, a view timeline button 410, a reconnect button 414, and a more information button 412. Various embodiments may have conversation history objects with a subset of the illustrated elements or additional elements.

The conversation name 402 includes a string of characters that identifies the conversation represented by the conversation history object 304. The conversation name may be automatically generated by the conversation manager based on the participants of the conversation and the types of media involved in the conversation. In some examples, the conversation name 402 may be manually set by the operating user.

The date 404 displays the date associated with the conversation represented by the conversation history object. The date 404 may include the date and time at which a conversation started or at which the conversation ended. The manner in which the date 404 is displayed can be based on user settings.

The participant list 406 includes a list of participants of the conversation represented by the conversation history object 304. In some embodiments, the participant list 406 may include all participants regardless of when they joined or left the conversation. Thus, regardless of how long a participant was part of a conversation, that participant may be included within the participant list 406.

The media type list 408 includes a list of the media types involved in the conversation represented by the conversation history object 304. The listed media types may include any type of media used by any participant during the course of the conversation. For example, if only one user uses a particular type of media for a relatively brief period of time, then that type of media may show up in the media type list 408. In some examples, only the media types used by the operating user may show up in the media type list 408.

The view timeline button 410 can be used by a user to view more specific data regarding what occurred during the conversation with respect to different participants and media types. For example, a timeline may indicate when, during the span of a conversation, a particular user joined or left the conversation. The timeline may also indicate when a particular user added or removed various types of media. More detail about the timeline will be discussed below with the text accompanying FIG. 5. The more information button 412 may be used to provide the user with other details about the past conversation in which the user may be interested.

The reconnect button 414 may be used to reestablish the conversation represented by the conversation history object. This function may be used as an alternative to the drag and drop function described above. Particularly, the user may engage the reconnect button 414 to automatically reestablish the conversation represented by the conversation history object as it existed at a specific point in the timeline of the conversation. The communication application detects that the user has pushed the reconnect button. In response the communication application sends a request to the conversation manager to reinitiate the conversation.

In one example, each of the elements shown in FIG. 4 may be present within the conversation history object as it is displayed within the conversation history list. In one example, some of the elements displayed in FIG. 4 may be present only when the conversation history object is in an expanded state. While in a non-expanded state, for example, the conversation history object 304 may display only the conversation name 402 and date 404. The user may expand or minimize the conversation history object 304 by various types of interactions with the object 304.

Figure 5:
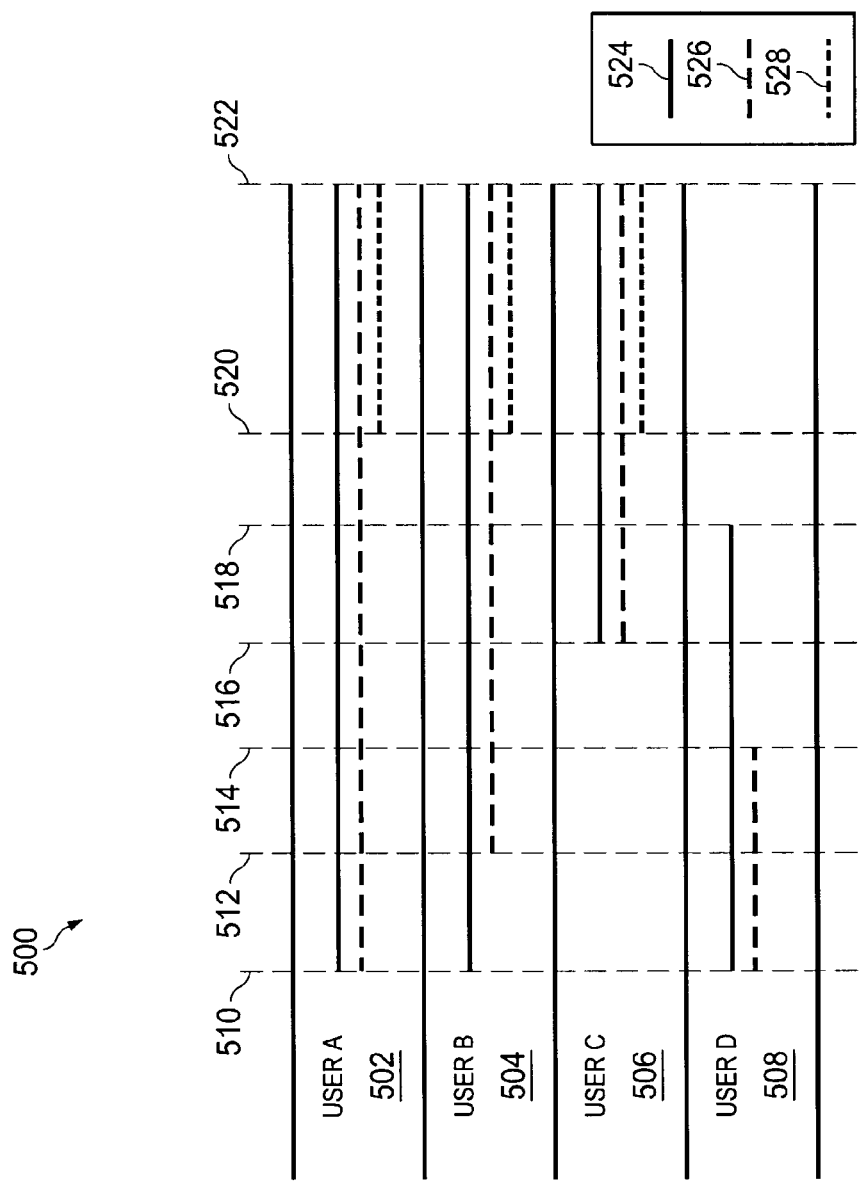
FIG. 5 is a diagram showing an illustrative timeline of a multiparty, multimedia conversation, according to one example of principles described herein.

FIG. 5 is a diagram showing an illustrative timeline of a multiparty, multimedia conversation. As described above, the timeline of a multiparty, multimedia conversation can be recorded. The timeline indicates when each of the participants of the conversation joined and left the conversation. Additionally, the timeline 500 indicates when each participant added or removed a particular type of media. The horizontal axis of the timeline represents time. There is a horizontal lane associated with each user 502, 504, 506, 508. The horizontal lines within a particular lane represent the presence of a media connection for the user associated with that lane. In the present example, the solid lines 524 represent voice communication, the large dashed lines 526 represent video communication, and the small dashed lines 528 represent a document sharing communication. In some examples, a user may wish to view a graphical representation of the timeline such as the timeline illustrated in FIG. 5. The timeline 500 may be displayed in response to a user selecting the view timeline 410 button illustrated in FIG. 4.

The timeline 500 starts at point 510 at which User A 502, User B 504, and User D 508 are part of the conversation. User A 502 and User D 508 are connected to the conversation using both voice and video communication as illustrated by the solid lines and the large dashed lines. User B 504, however, is using only voice communication. User C 506, has not yet joined the conversation at this point 510.

At point 512, User B 508 adds the video connection and continues with the voice communication. Adding a type of media to a conversation will be referred to as vertical escalation. Vertical escalation may be accomplished through the graphical user interface in a variety of ways. For example, the operating user may select an object on the toolbar 308 to escalate a voice only conversation to a voice and video conversation. During an ongoing conversation, when a user indicates through the user interface that he or she wishes to vertically escalate the conversation, the multimedia communication application 110 sends a request to the conversation manager 103. The conversation manager 103 then establishes an additional communication session between the operating user and the contact associated with the request for escalation. For example, if there is one stream of data being used for voice, then a second stream of data may be used for video. The second stream may utilize a different networking protocol than the first stream. In some cases, the conversation manager 103 may modify an existing stream to perform the escalation. For example, some protocols may be used for both audio and video data. Thus, the escalation can be performed without an additional stream of data using a different protocol.

At point 514, User D 508 removes video communication from the conversation. Removal of a type of media will be referred to as vertical de-escalation. Vertical de-escalation may also be initiated through the graphical user interface in a variety of ways. When a user indicates that he or she wishes to vertically de-escalate a conversation, the multimedia communication application 110 sends a request to the conversation manager 103. The conversation manager 103 then tears down the appropriate communication session between the requesting user and the other conversation participants using that type of media.

At point 516, User C 506 joins the conversation. User C 506 joins using both voice and video communication. Adding additional participants to a conversation will be referred to as horizontal escalation. Horizontal escalation may be done in a manner that is similar to that of starting a communication session with a single contact. When the multimedia communication application 110 determines that a user has requested to add another participant, the application 110 will instruct the conversation manager 103 to establish a multiparty conversation session between the current conversation participants and the new participant. Upon receiving the instruction from the user's client device, the conversation manager 103 will act accordingly.

At point 518, User D 508 leaves the conversation. Removal of participants from a conversation will be referred to as horizontal de-escalation. In response to a user leaving the conversation, the multimedia communication application of the leaving user can instruct the conversation manager 103 to remove that user from the present conversation. The conversation manager 103 then tears down specific media sessions associated with the leaving user.

At point 520, the remaining users, User A 502, User B 504, and User C 506, add a third type of media to the conversation, specifically, document sharing. At point 522, the conversation ends and the remaining participants leave the conversation. The record of the conversation, including the timeline 500 is then stored at the conversation manager 103, the user devices 106, or both. The communication applications 110 for each of the users 502, 504, 506, 508 may present a conversation history object representing the conversation to the respective users. The users can then use that object to reinitiate the conversation.

Because the conversation was in various states at different points in the conversation, reinitiating the conversation as it existed at a user selectable point in time of the conversation. For example, the user may interact by moving a cursor, or touching with a touchscreen, a point along the timeline. The conversation can then be established as it existed at the selected point in time. In one example, the user may be prompted when attempting to reinitiate the conversation as to what point in time within the terminated conversation should be reestablished. In some examples, the user selectable point in time may be a default setting. For example, a user may set the default setting to be the point in time at which the conversation ended. Or, a user may set the default setting to be the point in time at which the conversation began.

In one example, a user may select re-initiation of the conversation as it ended. In this example, the conversation ended with User A 502, User B 504, and User C 506 using three types of media. If, User D 508 were to attempt to reinitiate the conversation as it ended, the conversation would be reinitiated as it was at point 518 because that is when User D 508 left the conversation.

In some examples, a user may select re-initiation of the conversation as it began. In this example, for User A 502, User B 504, and User D 508, this would be as the conversation was at point 510. For User C 506, this would be as the conversation was at point 516 because that is when User C 506 joined the conversation. In some examples, a user may manually select any point within the timeline 500 to reinitiate.

In some examples, the conversation may be reinitiated as a cumulative total of all participants and a cumulative total of all media types. The aggregate of all participants includes users that participated in the conversation at any point, regardless of whether such users were part of the conversation at the same time. Thus, even if two different users participated during non-overlapping time intervals, the aggregate of the participants would include both of those users. In one example, User D 508 leaves before User C 506 joins. In such a case, the aggregate participants would still include both User D 508 and User C 506, even though both users were not part of the conversation at the same time.

Likewise, the aggregate of all media types may include all media types used at any point in the conversation. In some cases, the aggregate of the media type may correspond to a set of media types that were not used together at any specific point during the conversation. In one example, the conversation starts out with audio and screen sharing types of media. Then, screen sharing is removed before video is added. In such a case, the aggregate of media types would include audio, screen sharing, and video, even though these three media types were not used together at any point during the conversation.

In some examples, the timeline 500 may not necessarily capture the entire conversation. For example, the timeline 500 may only include a sub-portion of the entire conversation. The sub-portion may be user defined. In one example, a participant of the conversation may manually start the recording of the timeline and manually stop the recording of the timeline.

Figure 6:
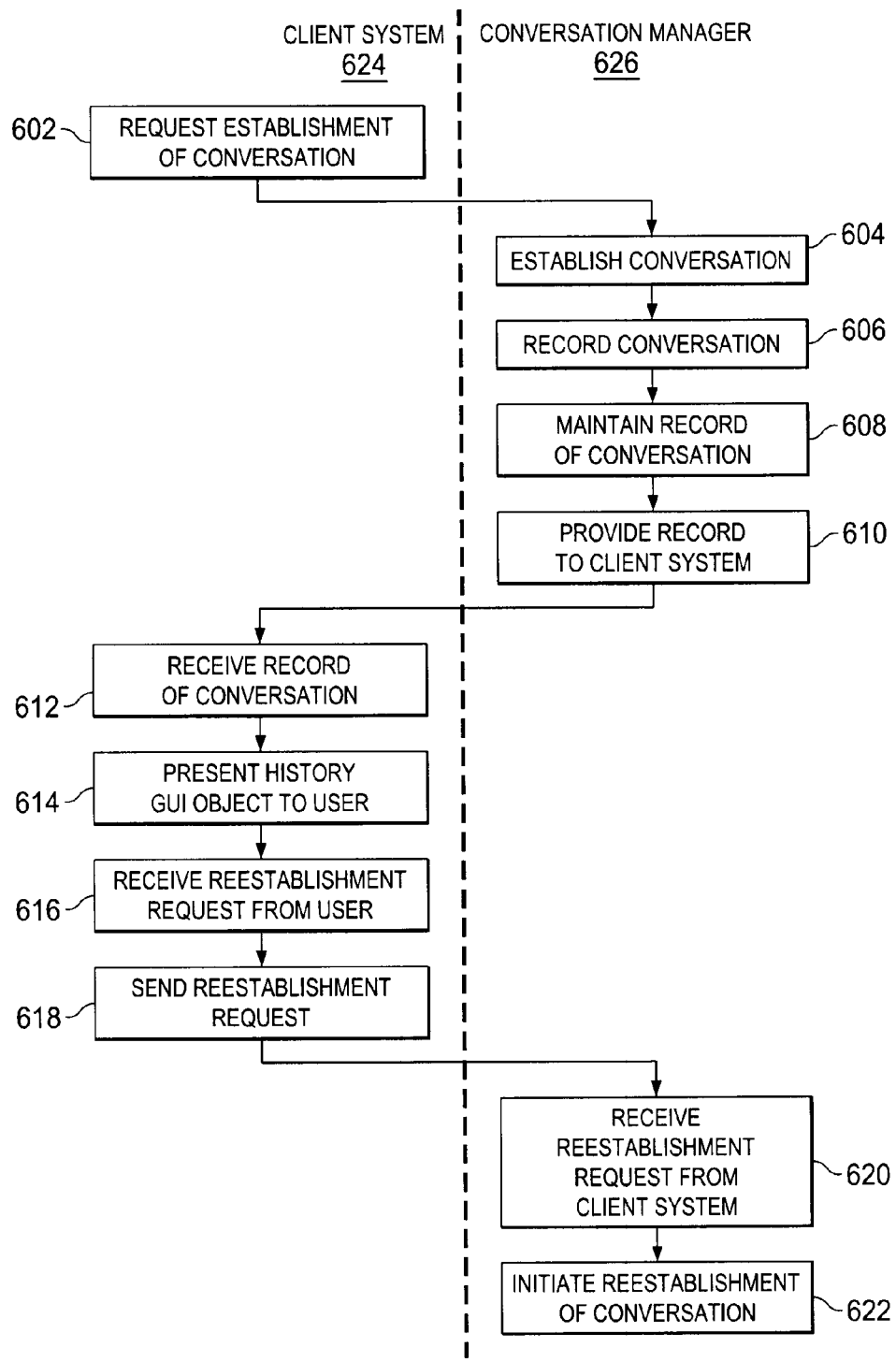
FIG. 6 is a diagram showing an illustrative method for utilizing a multiparty, multimedia conversation history, according to one example of principles described herein.

FIG. 6 is a diagram showing an illustrative method for utilizing a multiparty, multimedia conversation history. Steps illustrated on the left side are steps performed by a client system 624 such as a user communication device. Steps illustrated on the right side are steps performed by a conversation manager 626.

According to the present example, at step 602, the client system 624 requests establishment of a conversation. Specifically, a user may initiate a multimedia conversation with other users by identifying specific users and specific types of media. The conversation may involve multiple types of media. The client system 624 sends the request to the conversation manager 626. After receiving the request from the client system 624, at step 604, the conversation manager 626 establishes the conversation by setting up the appropriate communication sessions.

At step 606, the conversation manager 626 records a timeline of the conversation. The recorded timeline may be similar to the timeline described above in the text accompanying FIG. 5. Any other information may be recorded as well. In some cases, the entire audio and video streams may be recorded if allowed by the users. The recording may be performed by the conversation manager 626, the client system 624, or both.

At step 608, the conversation manager 626 maintains a record of the conversation. The conversation records may be stored on a server or in a cloud storage space. As described above, in some cases, the client systems 624 may also maintain a record of the conversation. In such cases, the records may be stored on local storage space. In some cases, the client systems 624, rather than the conversation manager 626, may maintain the record of the conversation. The record may include the timeline as well as the various types of data that may be useful in reestablishing the conversation. Such information may include the Internet Protocol (IP) address or Media Access Control (MAC) address of the devices associated with the participants of the conversation.

At step 610 the conversation manager 626 provides the record to the client system 624. If the conversation manager 626 maintains the conversation record, then the conversation manager sends the record to the client system 624. The client system 624 can then use the information in the record to present the conversation history object to the user. At step 612, the client system 624 receives the record from the conversation manager 626. Using the information within the record, at step 614, the client system 624 presents the conversation history object to the user. As described above, the conversation history object may present the user with various types of information that allows the user to identify the past conversation. Additionally, the conversation history object is interactive, thereby providing the user with a mechanism to reestablish the conversation.

At step 616, the client system 624 receives a request to reestablish the conversation represented by the conversation history object. As described above, this may be done by the user dragging and dropping the conversation history object into a conversation container. Alternatively, the user may use various other user interface methods for reestablishing the conversation.

At step 618, the client system 624 sends a request to reestablish the conversation to the conversation manager 626. At step 620, that request is received by the conversation manager 626. In response to receiving the request, at step 622, the conversation manager 626 initiates reestablishment of the conversation. Initiating reestablishment of the conversation includes sending out requests to connect to the participants. Specifically, the conversation manager 626 will attempt to connect to the appropriate conversation participants using the appropriate types of media. It may be the case that some participants are not available, and if they are, it may be the case that they are not available for each type of media.

In one example, a past conversation includes three participants, user A, user B, and user C, who communicated using voice communication and video communication. When user A indicates a desire to reestablish the conversation, the conversation manager 626 will attempt to establish voice and video communications between user A, user B, and user C. It may be the case that user B is unavailable and does not answer the request for communication. It may also be the case that user C is available but only with voice communication. This may be because user C is driving and can only use the audio function of his or her device. Thus, a conversation that is initiated may not actually be fully reestablished, but instead may be reestablished using best efforts with respect to available users and media types.

By using principles described herein, users can intuitively and effectively reestablish past multimedia, multiparty conversations. Users do not have to manually set up each individual connection to each desired user every time. This can allow users to communicate more efficiently and effectively.

Some examples of processing systems described herein may include non-transitory, tangible, machine readable media that include executable code that when run by one or more processors (e.g., processor 210, 224) may cause the one or more processors to perform the processes of method 600 as described above. Some common forms of machine readable media that may include the processes of method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:
    maintaining a record of a terminated conversation, the conversation comprising a plurality of participants and a plurality of media types, wherein the media types used during the conversation changed during the conversation;
    receiving a request from a client system associated with a participant of the terminated conversation, the request being to reestablish the terminated conversation; and
    in response to the request, initiating reestablishment of the terminated conversation by attempting to reestablish the terminated conversation, wherein attempting to reestablish the terminated conversation includes initiating communication sessions between a cumulative total of each of the participants using a cumulative total of each media type associated with the terminated conversation such that a reestablished conversation includes a set of users and a set of media types not present together at any given time during the terminated conversation.

2. The method of claim 1, further comprising, during the terminated conversation, recording a timeline of the terminated conversation, the timeline being used to form the record.

3. The method of claim 1, wherein the timeline comprises data indicating when each participant of the terminated conversation joined and left the terminated conversation.

4. The method of claim 1, wherein the timeline comprises data indicating what media types were used by each participant of the terminated conversation.

5. The method of claim 4, wherein the timeline comprises data indicating when each participant added an additional media type to the terminated conversation.

6. The method of claim 4, wherein the timeline comprises data indicating when each participant removed a media type from the terminated conversation.

7. A method performed by a client computing system, the method comprising:
- providing to a user of the client system, a conversation history object, the conversation history object being presented through a graphical user interface (GUI), the conversation history object representing a record of a terminated conversation in which the user was a participant, the terminated conversation including multiple participants and multiple media types, wherein at least one of the media types was added during the terminated conversation;
- in response to a user interaction with the conversation history object, transmitting to a conversation manager, a request to reestablish the terminated conversation with a cumulative total of each participant and a cumulative total of each media type used at any point in the terminated conversation, such that the conversation manager initiates reestablishment of the terminated conversation such that a reestablished conversation includes a set of users and a set of media types not present together at any given time during the terminated conversation.

8. The method of claim 7, wherein the conversation history object provides a summary of the conversation.

9. The method of claim 7, wherein the user interaction comprises engagement of a button associated with the conversation history object.

10. The method of claim 7, wherein the user interaction comprises movement of the conversation history object with respect to a different object within the GUI.

11. The method of claim 10, wherein the different object comprises a conversation container that represents ongoing conversations.

12. The method of claim 7, wherein the record comprises a timeline.

13. The method of claim 12, wherein the timeline comprises data indicating when each participant of the terminated conversation joined and left the terminated conversation.

14. The method of claim 12, wherein the timeline comprises data indicating what media types were used by each participant of the terminated conversation.

15. The method of claim 12, wherein the timeline comprises data indicating when each participant added an additional media type to the terminated conversation.

16. The method of claim 12, wherein the timeline comprises data indicating when each participant removed a media type from the terminated conversation.

17. A computing system acting as a conversation manager, the computing system comprising:
- a processor; and
- a memory comprising machine readable instructions that when executed by the processor, cause the system to:
- maintain a record of a terminated conversation, the conversation comprising a multimedia, multiparty communication session established by the computing system, wherein at least one type of media was added to the terminated conversation during the terminated conversation;
- provide record data to a client system for use with a conversation history graphical user interface (GUI) object that represents the record of the communication session, the client system being associated with a user who was a participant of the terminated conversation;
- receive input from the client system, the input requesting reestablishment of the terminated conversation; and
- initiate reestablishment of the communication session by initiating multimedia communication sessions between all participants of the terminated conversation with a cumulative total of types of media used at any point in time during the terminated conversation such that a reestablished conversation includes a set of users and a set of media types not present together at any given time during the terminated conversation.

18. The system of claim 17, wherein the terminated conversation comprises participants that joined or left the conversation during the conversation.

19. The system of claim 18, wherein to initiate reestablishment of the communication session, the system is further to initiate multimedia communication sessions between all participants of the terminated conversation that were part of the conversation at any time during the conversation.

20. The system of claim 18, wherein the record comprises a timeline indicating when each participant joined or left the conversation and when a media type was added to or removed from the conversation.

21. A method performed by a conversation manager on a server system, the method comprising:
- maintaining a record of a terminated conversation, the conversation comprising a plurality of participants and a plurality of media types, wherein the media types used during the conversation changed during the conversation;
- receiving a request from a client system associated with a participant of the terminated conversation, the request being to reestablish the terminated conversation; and
- in response to the request, initiating reestablishment of the terminated conversation by attempting to reestablish the terminated conversation, wherein attempting to reestablish the terminated conversation includes initiating communication sessions between the participants with a cumulative total of types of media used at any point in time during the terminated conversation such that a reestablished conversation includes a set of users and a set of media types not present together at any given time during the terminated conversation;
- wherein at least one of the participants accessed the conversation with a communication application within a same platform as the conversation manager, and at least one of the participants accessed the conversation with a communication application outside the platform.

* * * * *